United States Patent Office.

LOUIS BECKER, OF BALTIMORE, MARYLAND.

MANUFACTURE OF ROOT OR TONIC BEER.

SPECIFICATION forming part of Letters Patent No. 256,536, dated April 18, 1882.

Application filed March 30, 1881. (No specimens.)

*To all whom it may concern:*

Be it known that I, LOUIS BECKER, a citizen of the United States, residing at Baltimore city, State of Maryland, have invented certain new and useful Improvements in the Manufacture of Root-Beer; and I do hereby declare the following to be a full, clear, and exact description of the invention, such as will enable others skilled in the art to which it appertains to make and use the same.

My invention relates to the manufacture of root or tonic beers; and my object is to render the beer ferruginous by the addition thereto of any suitable form or preparation of iron.

I prepare my beer according to the following formula, viz: Take of Canada snake-root, three ounces; angelica-root, three ounces; Jamaica-ginger root, three ounces; hops, two ounces; sassafras-root, ten ounces; black-mustard seed, one ounce; southern prickly-ash bark, two ounces; sugar, (granulated,) twelve pounds; water, ten gallons; burnt sugar (caramel) to color; malo-citrate of iron, (in solution,) one thousand grains. Bruise the roots, barks, hops, and seed, and digest in water twelve hours; strain off the liquid and dissolve the sugar and tartaric acid therein; color to suit with burnt sugar; and then ferrate the beverage in the following manner before charging it with carbonic-acid gas: Into every gallon of the beverage incorporate ten grains of the oxide of iron, or its equivalent of any preparation of iron having ferric oxide in combination. Thus the solution of malo-citrate of iron contains ten per cent. of ferric oxide in combination. It would accordingly require one hundred grains of the solution of malo-citrate of iron to ferrate one (1) gallon of the beverage according to the above formula. Ferric oxide is insoluble in water, and it is therefore preferable to use a soluble preparation having it in combination, such as the soluble salts of iron, tinctures or solutions, &c.

For the special purpose of ferrating beverages I prepare a solution of malo-citrate of iron. This I accomplish by combining the ferric oxide with the acids of the lemon and apple, viz: Take of black oxide of iron at will; juice of sour apple sufficient. Heat the juice to the boiling-point; add the oxide as long as any is dissolved; cool, filter, and evaporate to dryness. Take of this extract four ounces; citrate of iron, (in scales,) eight ounces. Mix them together and dissolve them in prepared apple-juice, forty-eight ounces. Let stand twelve hours and filter through paper.

The prepared apple-juice is made by allowing apple-juice to undergo the first stage of fermentation--arresting further fermentation by filtering through sand and felt and by boiling the cider down to half its volume and then add three per cent. of glycerine to preserve it. It should be kept in well-stopped bottles or barrels and in a cold place.

The solution of malo-citrate of iron as above prepared contains about ten per cent. of ferric oxide, is soluble, and convenient for mixing or ferrating beverages. It has none of the injurious properties ascribed to some other iron preparations; and the fruit acids of lemon and apple which it has in combination render it of special value to beverages.

When this root-beer above described is intended to be kept for any length of time, or intended for transportation, I add one-fifth to one-fourth of one per cent. of sulphite of lime. Iron gives to root-beers the value of true tonics—in therapeutics iron tonics—a property not hitherto possessed by any of the known artificial beverages, and makes a valuable substitute for the chalybeate waters, being stronger or richer in iron, more palatable, and less expensive.

I claim—

In the manufacture of root or tonic beer, the herein-described compound, consisting of Canada snake-root, Jamaica-ginger root, angelica-root, hops, sassafras, black-mustard seed, prickly-ash bark, tartaric acid, and malo-citrate of iron, substantially as set forth.

In testimony whereof I have affixed my signature in presence of two witnesses.

LOUIS BECKER.

Witnesses:
C. H. SLICER,
HENRY SCHMITZ.